United States Patent
Civanlar et al.

(10) Patent No.: US 10,425,327 B2
(45) Date of Patent: Sep. 24, 2019

(54) SYSTEM AND METHOD FOR ROUTING IN SOFTWARE DEFINED NETWORKS USING A FLOW HEADER

(71) Applicant: ARGELA YAZILIM VE BILISIM TEKNOLOJILERI SAN. VE TIC. A.S., Istanbul (TR)

(72) Inventors: Seyhan Civanlar, Istanbul (TR); Sinan Tatlicioglu, Istanbul (TR); A Metin Balci, Istanbul (TR)

(73) Assignee: Argela Yazilim ve Bilisim Teknolojileri San ve Tic. A.S. (TR)

( * ) Notice: Subject to any disclaimer, the term of this patent is extended or adjusted under 35 U.S.C. 154(b) by 108 days.

(21) Appl. No.: 15/348,778

(22) Filed: Nov. 10, 2016

(65) Prior Publication Data

US 2018/0131602 A1    May 10, 2018

(51) Int. Cl.
| | |
|---|---|
| H04L 12/721 | (2013.01) |
| H04L 12/935 | (2013.01) |
| H04L 12/741 | (2013.01) |
| H04L 12/715 | (2013.01) |
| H04L 12/717 | (2013.01) |

(52) U.S. Cl.
CPC .............. *H04L 45/38* (2013.01); *H04L 45/42* (2013.01); *H04L 45/64* (2013.01); *H04L 45/745* (2013.01); *H04L 49/3009* (2013.01)

(58) Field of Classification Search
CPC .... H04L 45/38; H04L 45/745; H04L 49/3009
See application file for complete search history.

(56) References Cited

U.S. PATENT DOCUMENTS

| | | | |
|---|---|---|---|
| 8,949,467 B1* | 2/2015 | Flanagan ................ H04L 69/04 709/247 |
| 9,756,152 B1* | 9/2017 | Stark ....................... H04L 69/22 |
| 9,807,006 B1* | 10/2017 | Stark ..................... H04L 45/745 |
| 2010/0172375 A1* | 7/2010 | Rochon ................... H04L 69/04 370/474 |
| 2013/0136128 A1* | 5/2013 | Robinson ................ H04L 45/74 370/392 |
| 2014/0119367 A1* | 5/2014 | Han ..................... H04L 12/4633 370/389 |
| 2014/0328350 A1* | 11/2014 | Hao ........................ H04L 47/80 370/401 |
| 2015/0043589 A1* | 2/2015 | Han ........................ H04L 45/38 370/392 |
| 2015/0063118 A1* | 3/2015 | Domzal .................. H04L 45/24 370/236 |
| 2016/0173338 A1* | 6/2016 | Wolting ................ H04L 41/145 709/223 |

* cited by examiner

*Primary Examiner* — Tejis Daya
(74) *Attorney, Agent, or Firm* — IP Authority, LLC; Ramraj Soundararajan

(57) ABSTRACT

An ingress forwarder receives the IP packet and strips off the entire packet header and replaces it with the simple flow header assigned by the controller, and looks up its flow-table to determine from which port to forward the packet. All other forwarders along the path up to the egress forwarder perform the forwarding action simply by inspecting the flow header. The egress forwarder, before forwarding to the egress port, replaces the flow header with the original layer-2/3/4 header. Doing so, the host behavior remains unchanged while the routing/forwarding within the cloud of SDN is performed based on only the flow header.

16 Claims, 6 Drawing Sheets

F1:

FLOW TABLE 1 (header swap rule table)

Match [IPs= 12.2.3.14 & IPd=17.2.3.123]   Action: replace header with flow header[flow-ID =1207]

Match [IPs= 12.2.3.14 & IPd=9.2.3.17]    Action: replace header with flow header[flow-ID =808]

Match [any flow header ]                 Action: use next table (i.e., TABLE 2)

FLOW TABLE 2 (Shortest path forwarding rule table)

Match flow-ID: [300-600]     Action: forward to p1

Match flow-ID: [800-900]     Action: forward to p2

Match flow-ID: [1200-1500]   Action: forward to p1

F2:

FLOW TABLE 1 (firewall rule table)

Match flow-ID 1207          Action: forward to p7

Match [any flow header]     Action: use next table (i.e., TABLE 2)

FLOW TABLE 2 (firewalled traffic rule table)

Match [any flow ID received at p7]   Action: use next table (i.e., TABLE 3)

FLOW TABLE 3 (Shortest path forwarding rule table)

Match flow-ID: [1-200]       Action: forward to p3

Match flow-ID: [800-900]     Action: forward to p4

Match flow-ID: [1200-1500]   Action: forward to p5

FIG. 3

SYSTEM AND METHOD FOR ROUTING IN SOFTWARE DEFINED NETWORKS USING A FLOW HEADER

BACKGROUND OF THE INVENTION

Field of Invention

The present invention pertains to routing of packet flows in a programmable network such as a software-defined network (SDN) wherein flow routing is performed by using a much shorter flow header assigned by the SDN and forwarding solely based on the flow header. A flow-ID, according to this invention is used in the flow header to identify a flow.

Discussion of Related Art

The invention presented herein is concerned with a system and method to enable obfuscated communications between a source host and destination host preventing unauthorized users accessing a traffic flow, by completely decoupling IP addressing from routing and packet forwarding. Forwarding the new packets solely based on a flow ID eases and speeds up data forwarding. Furthermore, simply by replacing a much longer header with a short header, it improves efficiency of forwarding and network capacity utilization.

In the traditional public Internet, all Internet-attached devices, e.g., hosts, servers and routers are labeled with IP addresses. Each data packet between a pair of Internet-attached device is labeled by the source and destination IP addresses within a packet header along with other mandatory and optional fields (port number, checksum, protocol type, etc.). Route determination is the process of determining the path between a pair of Internet-attached devices. Routing (sometimes called forwarding or switching), on the other hand, is the process of forwarding a data packet based on the destination IP address along a determined route. As a default behavior, each router on the path between the source and destination receiving the packet inspects the packet header and determines which port of the router to forward that packet based on (i) the destination IP address at the packet header and (ii) the 'routing table' stored in the router which is created in real-time within the network wherein the routing intelligence is completely distributed. The route of the packet is usually determined by using a shortest path routing algorithm such as Open Shortest Path Forwarding (OSPF). Thus, IP addresses are used for two main purposes (i) to address/label devices, and (ii) to route traffic between devices. The Internet architecture tightly couples these two key functions and assumes they are interlinked. This paradigm suits the distributed nature of routing in the current Internet wherein there is no central intelligence aware of the entire network topology to govern routing. In contrast, a programmable or a software-defined network (SDN) has a centralized route determination function wherein information of whereabouts of all Internet-attached devices is collected within a centralized logic, which then makes the determination of routes. Thus, running a simple shortest path algorithm at every router is no longer necessary. The centralized route determination can take into consideration many sophisticated constraints such as route ownership, quality or security of the route, etc. Essentially, IP addressing and routing can be 'loosely' coupled in a programmable network.

Embodiments of the present invention are an improvement over prior art systems and methods.

SUMMARY OF THE INVENTION

In one embodiment, the present invention provides a method as implemented in a controller in a software defined network (SDN) facilitating communications between a first host and a second host, the controller controlling at least a first forwarder and a second forwarder in the SDN, the first host, attached to the first forwarder, originating a packet flow with the second host, attached to the second forwarder, as its destination, the method comprising: (a) determining a flow header for packets in the packet flow; (b) sending a first control message to the first forwarder to swap an original packet header of packets in the packet flow with the flow header determined in (a) prior to forwarding packets towards the second forwarder; (c) sending a second control message to the second forwarder to swap the flow header with the original packet header prior to sending packets towards the second host; and wherein the first forwarder swaps the original packet header with the flow header and forwards packets in the packet flow towards the second forwarder by looking up a first flow table corresponding to the flow header, and the second forwarder swaps the flow header back to the original packet header and forwards packets in the packet flow towards the second host by looking at a second flow table for an entry with the original packet header.

In another embodiment, the present invention provides a method as implemented in a controller in a software defined network (SDN) facilitating communications between a first host and a second host, the controller controlling at least a first forwarder, a second, transit, forwarder and a third forwarder in the SDN, the first host, attached to the first forwarder, originating a packet flow with the second host, attached to the third forwarder, as its destination, the method comprising: (a) determining, for packets in the packet flow, a flow header in which there is a free flow ID assigned from a flow ID block allocated by the controller to the third forwarder and unused by any other packet flow at time of assignment; (b) sending a first control message to the first forwarder to swap an original packet header of packets in the packet flow with the flow header determined in (a) prior to forwarding packets towards the second, transit, forwarder; (c) sending a second control message to the third forwarder to swap the flow header with the original packet header prior to sending packets towards the second host; and wherein the first forwarder swaps the original packet header with the flow header and forwards packets in the packet flow towards the second, transit, forwarder by looking up a first flow table corresponding to the flow ID block of the third forwarder in which the free flow ID falls, and the second, transit, forwarder forwards packets in the packet flow towards the third forwarder by looking up a second flow table corresponding to the flow ID block of the third forwarder, and the third forwarder swaps the flow header back to the original packet header and forwards packets in the packet flow towards the second host by looking at a third flow table for an entry with the original packet header.

In yet another embodiment, the present invention provides a controller in a software defined network (SDN), the controller sending flow table entries to a plurality of forwarders that include a swapping action from an original packet header to a flow header determined by the controller, the controller comprising: (a) a first database of forwarder flow ID blocks storing available flow IDs, each flow ID partitioned to each forwarder per a set of stored rules; (b) a second database of assigned flow IDs pertaining to active flows and unassigned flow IDs pertaining to yet-to-be-active flows; (c) a third database of packet-header-to-flow-header mapping between an original packet header to a corresponding flow header for each live flow; (d) an interface to send flow table entries with an action of header swap from an original packet header to a flow header, and vice-versa, to forwarders; (e) a flow header assigner sub-system that assigns flow-IDs to packet flows per the set of rules; and (f) a flow ID block manager sub-system assigning flow-ID blocks to forwarders.

In another embodiment, the present invention provides a method as implemented in a controller in a software defined network (SDN) facilitating communications between a first host and a second host, the controller controlling at least a first forwarder and a second forwarder in the SDN, the first host, attached to the first forwarder, originating a packet flow with the second host, attached to the second forwarder, as its destination, wherein the controller determines a flow ID for all packets belonging to a specific packet flow, the method comprising: (a) establishing a control channel between the first host and the controller and establishing another control channel between the second host and the controller; (b) receiving, from the first host, a flow ID reservation for the specific packet flow destined to the second host using the control channel; (c) replying to the first host on the control channel with a flow ID and programming forwarders on a communication path in the packet flow; and (d) sending a message using the another control channel to the second host about the flow ID the first host will use for the specific packet flow, where the first host wraps packets of the specific data flow with a flow header using the flow ID and sends them to the first forwarder to which it is attached, and where forwarders on the communication path forwards packets in the specific packet flow according to forwarding rules provided by the controller and the second host, upon receiving the packets in the specific packet flow, removes the flow header and delivers data to corresponding application.

In another embodiment, the present invention provides an article of manufacture comprising non-transitory computer storage medium storing computer readable program code which, when executed by a processor in a single node, implements a method as implemented in a controller in a software defined network (SDN) facilitating communications between a first host and a second host, the controller controlling at least a first forwarder and a second forwarder in the SDN, the first host, attached to the first forwarder, originating a packet flow with the second host, attached to the second forwarder, as its destination, the computer storage medium comprising: (a) computer readable program code executed by the controller to determine a flow header for packets in the packet flow; (b) computer readable program code executed by the controller to send a first control message to the first forwarder to swap an original packet header of packets in the packet flow with the flow header determined in (a) prior to forwarding packets towards the second forwarder; (c) computer readable program code executed by the controller to send a second control message to the second forwarder to swap the flow header with the original packet header prior to sending packets towards the second host; and wherein the first forwarder swaps the original packet header with the flow header and forwards packets in the packet flow towards the second forwarder by looking up a first flow table corresponding to the flow header, and the second forwarder swaps the flow header back to the original packet header and forwards packets in the packet flow towards the second host by looking at a second flow table for an entry with the original packet header.

In another embodiment, the present invention provides an article of manufacture comprising non-transitory computer storage medium storing computer readable program code which, when executed by a processor in a single node, implements a method as implemented in a controller in a software defined network (SDN) facilitating communications between a first host and a second host, the controller controlling at least a first forwarder, a second, transit, forwarder and a third forwarder in the SDN, the first host, attached to the first forwarder, originating a packet flow with the second host, attached to the third forwarder, as its destination, the method comprising: (a) computer readable program code executed by the controller to determine, for packets in the packet flow, a flow header in which there is a free flow ID assigned from a flow ID block allocated by the controller to the third forwarder and unused by any other packet flow at time of assignment; (b) computer readable program code executed by the controller to send a first control message to the first forwarder to swap an original packet header of packets in the packet flow with the flow header determined in (a) prior to forwarding packets towards the second forwarder; (c) computer readable program code executed by the controller to send a second control message to the third forwarder to swap the flow header with the original packet header prior to sending packets towards the second host; and wherein the first forwarder swaps the original packet header with the flow header and forwards packets in the packet flow towards the second, transit, forwarder by looking up a first flow table corresponding to the flow ID block of the third forwarder in which the free flow ID falls, and the second, transit, forwarder forwards packets in the packet flow towards the third forwarder by looking up a second flow table corresponding to the flow ID block of the third forwarder, and the third forwarder swaps the flow header back to the original packet header and forwards packets in the packet flow towards the second host by looking at a third flow table for an entry with the original packet header.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 3 illustrates the flow tables of the forwarders of the exemplary network.

DESCRIPTION OF THE PREFERRED EMBODIMENTS

Figure 1:
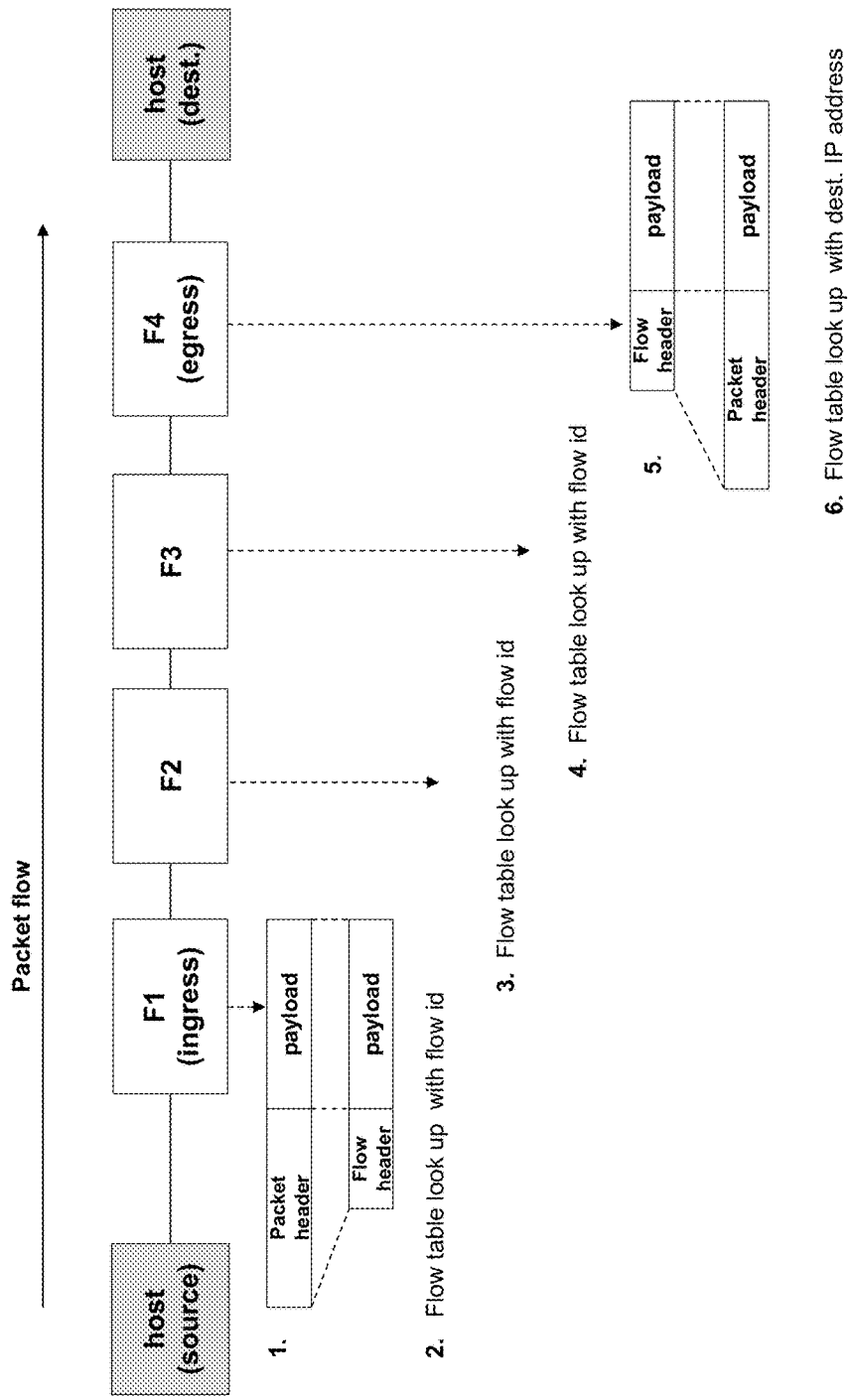
FIG. 1 illustrates key actions of forwarders to support flow header concept.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

An electronic device (e.g., a router, switch, forwarder or controller) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device, such as a forwarder or a controller, is a piece of networking equipment, including hardware and software that communicatively interconnects other equipment on the network (e.g., other network devices, end systems). Forwarders provide multiple layer networking functions (e.g., routing, bridging, VLAN (virtual LAN) switching, layer-2 switching, Quality of Service, and/or subscriber management), and/or provide support for traffic coming from multiple application services (e.g., data, voice, and video). A network device is generally identified by its media access (MAC) address, Internet protocol address.

Note while the illustrated examples in the specification discuss mainly a programmable network such as an SDN system, embodiments of the invention may be implemented in a non-SDN system. It can be implemented in any layered network architecture such as a Network Function Virtualization (NFV) architecture wherein there is control infrastructure separated from data handling. Unless specified otherwise, the embodiments of the invention apply to any controller of the layered network architecture, i.e., they are NOT limited to an SDN controller.

This invention is a further exploitation of the centralized route determination architecture of programmable networks by using IP addressing only to label Internet attached devices. Instead of using the packet header for routing across the network, it uses a simple replacement 'flow header' which is much shorter than the packet header and has no association with the end points' actual IP addresses. This header is determined by the controller and has a meaning only within the scope of an SDN. Furthermore, a flow-ID is used in the flow header in order to identify the specific packet flow, wherein the flow-ID (i) comes from the flow-ID range associated with the egress router for the traffic that is normally processed, and (ii) from a special pool for the traffic that needs special handling (such as source routing, QoS or firewalling). Depending on the implementation, the flow header may or may not include additional fields such as 'Time Stamp', 'Check Sum', 'Hop Count' and 'Sequence Number'.

Although Multi-Protocol Label Switching (MPLS) embraces a label-based forwarding, it is a retrofit of the layer-3 (IP) header (referred as layer-2.5 because the label is inserted between the layer-2 header and layer-3 header) within a limited label size. Meaning, both the IP and Ethernet headers are present. Furthermore, an MPLS label has usually local meaning within a router and has to be swapped to another label before exiting the router until it reaches the egress. The Label Distribution Protocol (LDP) is a protocol defined in RFC 5036 for the purpose of distributing labels in an MPLS environment. LDP relies on the underlying routing mechanism provided by an Intra-domain Gateway Protocol (IGP), such as OSPF in distributing labels. The L2 Virtual Private Line Service (VPLS) of the prior art is a technique stretching an Ethernet/LAN across multiple corporate sites that are geographically apart. It is also known as the Virtual LAN service. Protocols such as MPLS or Generic Routing Encapsulation (GRE) provide tunneling to transport VPLS across a Wide Area Network (WAN). Asynchronous Transfer Mode (ATM) is yet another prior art protocol using fixed-size packets with a 53-byte header and a signaling protocol to set up virtual circuits. ATM is categorized as a layer-2 protocol designed primarily to carry packetized constant bit rate voice traffic across a WAN.

The minimum IPv4 header's length is 20 bytes and the maximum is 60 bytes. IPv6 header is 40 bytes. MPLS tag/label is an additional 20 bits. Label insertion and removal from the packet header are performed at the MPLS tunnel end points.

An important property of the concept of flow header is the removal of the entire OSI layer 2, layer 3 and layer 4 (layer-2/3/4) headers and therefore its simplicity. The source and destination IP addresses and ports, and other packet information, and labels/tags are completely stripped out from the packet, and instead an identifier of the particular flow is inserted as a header. From thereon, only the flow header is used in the 'match' operation of a flow table in a forwarder. If any field of the packet header other than the destination IP address is used to forward the packet towards the destination, i.e., any type of special processing is needed for a flow (firewalling, QoS, non-shortest path route selection, etc.), then the controller may assign special flow IDs to such flows.

A simple forwarding operation according to an aspect of this invention works as follows: The ingress forwarder receiving the IP packet strips off the entire packet header and replaces it with the simple flow header assigned by the controller, and looks up its flow-table to determine from which port to forward the packet. All other forwarders along the path up the egress forwarder perform the forwarding action simply by inspecting the flow header. The egress forwarder, before forwarding to the egress port, replaces the flow header with the original layer-2/3/4 header. Doing so, the host behavior remains unchanged while the routing/forwarding within the cloud of SDN is performed based on only the flow header.

In another embodiment, the forwarder can operate in a dual mode, i.e., forward some packet flows based on the normal IPv4/IPv6/Ethernet/VLAN packet header and other flows based on the flow header. In a dual mode operation, wherein both types of flows, with IP header and flow header, have to be processed by the forwarder, a 'virtual port' designated solely to forward packets with flow headers may be used. Such a virtual port on every physical port can be designated in the entire network. In another embodiment, each flow header can start with a special signature (a bit pattern). A bit mask is can be applied to distinguish different types of headers.

The IP header-based forwarding uses prefix/subnet-based route aggregation to keep the flow table sizes as small as possible. Since we lost the concept of 'prefix' in a flow header, we can achieve route aggregation by assigning 'ranges' or 'blocks' of flow-IDs to forwarders. For example, all flows going to egress router X may use a range of flow-ID from 1-1000, etc. With that assignment, the flow table can point to a single table entry for that range that can be programmed even when there are no live flows using flow-IDs in that specific range. Given the flow-ID 'assigner' is the controller that has the global view of the entire network, it can optimize the assignment of ranges of flow-IDs to maximize aggregation. In summary, a key feature of the flow header concept is that an active packet flow destined to a specific egress forwarder is assigned a flow-ID from that flow's egress router's flow-ID range, unless a special processing is needed for the flow. Furthermore, the range of flow IDs assigned to an egress forwarder can dynamically be divided into subdomains by the controller so that each subdomain will require a specific policy application.

There are several advantages of using a flow header:

Anonymity: The header is not meaningful for the world outside the realm of that SDN. It is not, IP, ATM or another known protocol header. For example, an intruder can't determine the origination or destination IP addresses of the packet by capturing a flow header. The flow header can be scrambled by each forwarder. The unscrambling can be performed algorithmically or upon instructions from the controller. The flow header can have dynamic values. The SDN controller can change it over time for the same active flow, or can even reallocate blocks of flow-IDs to forwarders in a randomized manner to confuse an intruder. The dynamic nature of a flow header gives it an added superiority over an IP header that is static. IP header is parse-able (i.e., everyone knows the meaning of each field in the header), but the flow header is SDN-proprietary and unparseable.

Header Compression: Because flow header is much shorter than the TCP/IP header, it achieves significant header compression, and thereby bandwidth efficiency. Although there are techniques such as Robust Header Compression (ROHC) (reference: RFC 3095 Robust Header Compression (ROHC), Internet Engineering Task Force (IETF)) developed primarily for cellular networks, the method of this invention is superior as it eliminates the need to rely on differential-headers to achieve compression and hence dependency of successive packets for header recovery. ROHC suffers from lost frames during congestion, wherein the compression achieved with flow header has no dependency on network congestion state because each packet has a complete flow header.

Look-up Time Efficiency: Because the header is much shorter than the IP header, the look up time within the network switches for forwarding table match-actions takes much shorter time and hence the packet sojourn time through a switch is shorter.

Improved Forwarding Efficiency: Because pool of flow-IDs can be reserved to different class of services or policies, a forwarding efficiency can be achieved for those packets that are driven by policies different than shortest path.

The flow header can be of fixed or variable length. If the flow header is of variable length, then the header will include a header length field at the beginning of the header. Since the IPv4 source and destination addresses are 4 bytes each, the size of a flow header to cover all possible Internet paths (the maximum number of IPv4 addresses for both source and destination) in the Internet is only 8 bytes (note that the realistic number of feasible IPv4 addresses is much smaller than 4 bytes due to the subnet structure). It might be more desirable to have a fixed length flow header for simplicity.

The controller can make a determination to use a flow header for certain types of flows, either based on a user request or based on source and/or destination addresses, or it may elect to use it for its entire traffic. The controller keeps a database of flow-IDs that are free (unassigned) and in-use (assigned) for each forwarder. When active flows have no more packets over a certain period of time, the corresponding flow-IDs are returned to the free (unassigned pool). This can be achieved by I. Switch Notification: The egress switch sends a message to the controller that a 'flow-ID' is now free. The egress switch notices that no more packets are arriving using that flow-ID for a certain (specified) time period.

II. Flow-ID aging timer: Controller associates an aging timer to each newly assigned flow-ID. After the timer expires, it changes the state of the flow-ID to unassigned in the flow ID database. In parallel, it removes the forwarding entries associated with that previously assigned flow-ID. The aging timer is sufficiently long, i.e., 3 hours.

III. Permanent Flow IDs: Each flow ID signifies a source and destination IP address pair. The port number may be contained within the flow header.

The database of flow-IDs can have an unstructured list of flow-IDs, or structured, e.g., grouped based on egress forwarders as described above, or partitions of both.

In another embodiment, the host behavior can be modified to use a flow header to forward packets end-to-end, eliminating the need to perform the 'header swapping' process described above. This alternative requires (i) major changes in the host's operating system (OS), which formulates packet headers at OSI layers 2, 3 and 4, and (ii) a special control channel implementation between each host and the controller. The source host, before sending a flow towards a destination host, communicates with the controller through the control channel and reserves a flow ID, and only after then it sends its data packets wrapped with a flow header using the reserved flow ID. The reserved flow ID is communicated to the destination host as well using the control channel so that it can associate the incoming flow with a source IP address. When the destination responds to the source (in case of a bi-directional flow), another flow ID will be needed for the reverse flow direction. This embodiment is of course much harder than the other embodiments since it requires a major OS change. We elected to describe in detail the header swapping scenario in this patent application in which the host behavior is unaltered.

FIG. 1 illustrates the three main actions required, i.e., header-swap; forward; header-swap operations of the flow header based forwarding. In this diagram, a packet flow between a source host and destination host within an SDN traverses forwarders, F1, F2, F3 and F4, wherein F1 is the ingress and F4 is the egress forwarder. F2 and F3 are the transit forwarders. F1 first performs a header swap from the packet header to the flow header according to the controller's instructions, and then looks up the flow table for a match with the Flow-ID, which is located in the flow header. When there is a match, the action would be to forward the packet to the port of F1 towards F2. Similarly, forwarders F2 and F3 perform only a flow table look up according to a match with that Flow-ID. The corresponding action would be to forward to the packet to the port towards the next forwarder along the path. Finally, F4, the egress forwarder, first performs a header swap from the flow header to the original packet header, according to the Flow-ID in the header, and then looks up the flow table according to a match with the destination IP address which is in the inserted packet header. All these instructions are sent to F1, F2, F3 and F4 by the controller when the first packet of the flow is sent by F1 to the controller.

In another embodiment, the ingress forwarder obtains the flow-ID corresponding to a flow using a special interface towards a 'flow-ID service (FIS)'. FIS (similar to DNS) has access to flow-ID database of the controller and can assign an unused flow-ID to a flow. This mechanism avoids the requirement of the first packet of each flow to be sent towards the controller to obtain the flow-ID, which may leave an open door for clogging the control channel by a DDOS attacker. The ingress router sends the packet header of the new flow to FIS, which in turn assigns an unused flow-ID from the flow's egress router's flow-ID space for a normal flow, or, if the flow requires a special treatment, then it assigns a flow ID from a special pool. FIS checks to determine with the controller if the flow requires a special treatment.

The allocation and assignment of flow-IDs to packet flows are important aspects of this invention for efficient processing of packet headers and for keeping the size of flow tables manageable. In one embodiment, the flow-ID blocks are assigned to each forwarder of the SDN. The size of the flow-ID block allocated to each forwarder can be based on the actual switching capacity of the forwarder in terms of packets per second (pps) (e.g., a large forwarder with 1 Tpps gets a larger block of flow-IDs than a small access forwarder), or possible based on the total attached facility bandwidth (e.g., 10 facilities attached to the forwarder, each with 1 Gbps bandwidth yielding a 10 Gbps max. throughput). The switching capacity or the total bandwidth of facilities are excellent indicators of the size and processing power of a forwarder. It makes sense to assign large flow-ID blocks to the core and the gateway forwarders and smaller blocks to the access forwarders. The assignment is made by the controller and adjusted from time to time as the network capacity changes, forwarders are added or removed, and facilities/ports are added or removed. Furthermore, the controller watches the utilization of the flow-ID block by each forwarder, and accordingly, may expand or shrink the block over predetermined observation periods.

If an operator's SDN is divided into 'slices' for specific reasons such as hosting a Managed Virtual Network Operators (MVNOs), the flow-ID blocks can be conveniently divided to assign different sub-blocks of flow-ID blocks to different MVNOs, making network management much easier.

Figure 2:
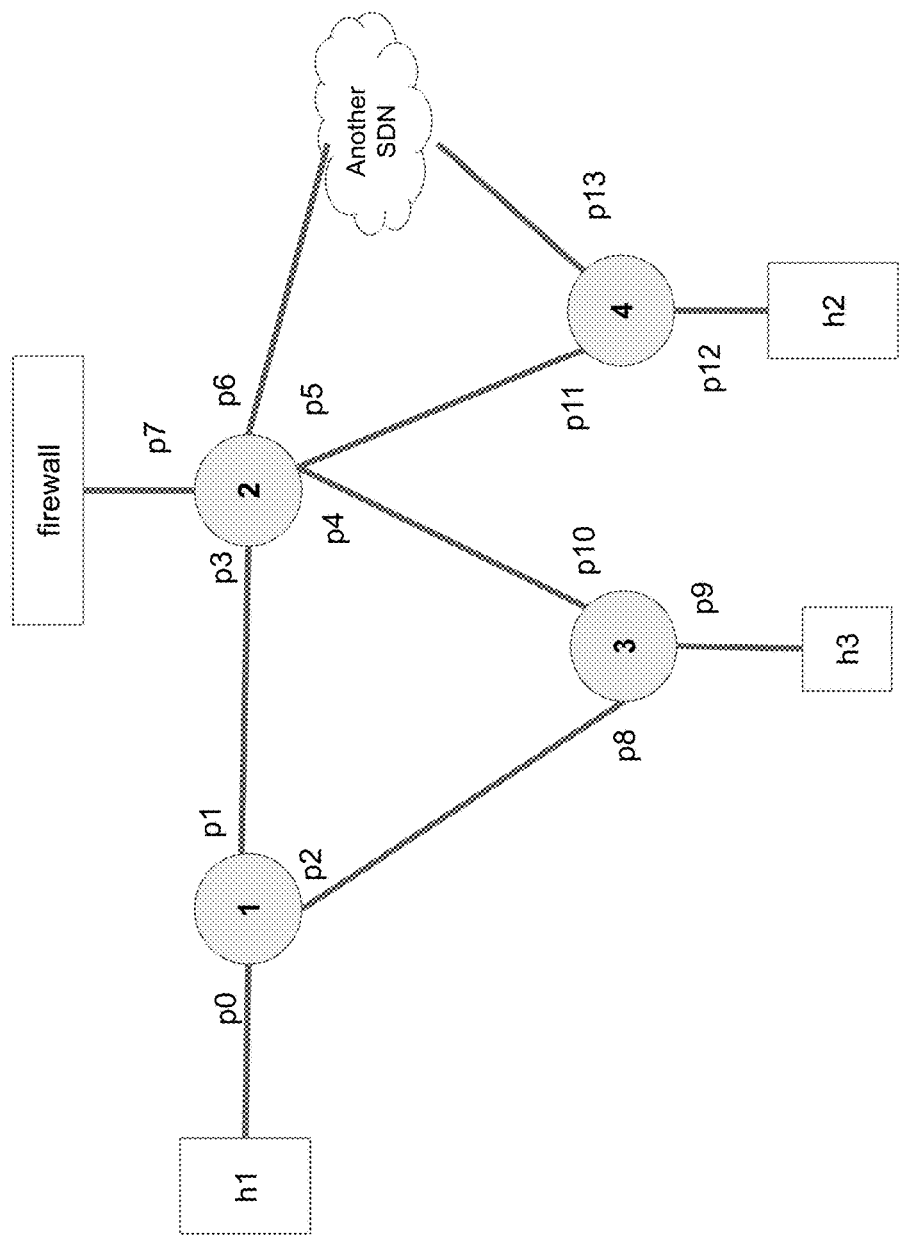
FIG. 2 illustrates a simple exemplary SDN with four nodes.

An exemplary simple SDN with four forwarders (F1, F2, F3 and F4) is illustrated in FIG. 2. There are three hosts, h1 (IP=12.2.3.4), h2 (IP=17.2.3.123) and h3 (IP=9.2.3.17), attached to forwarders 1 (at port p0), 4 (at port p12) and 3 (at port p9) respectively, and a network-based firewall attached to forwarder 2 at port p7. If there is any web traffic (i.e., port 80) that passes through F2, it must first be sent to the firewall, and then traffic returning from the firewall must be sent towards the egress.

Let us assume that there are 2 new flows: h1→h2 (web traffic, i.e., TCP port 80) and h1→h3 (telnet traffic, i.e., TCP port 107). The shortest route for h1→h2 is: F1-F2-F4, while the shortest route for h1→h3 is F1-F3. However, since h1→h2 traffic is targeted to port 80, and passes through F2, it needs a special treatment of passing through the firewall first. Therefore, the correct complete path for the h1→h2 traffic is F1-F2-Firewall-F2-F4.

Let us assume that the controller assigned the following flow-ID blocks to each forwarder, and also keeps a reserve or a special pool of 1800-2000 for flows that require additional processing in the network. Note that the flow-ID ranges are not contiguous across forwarders to leave some space for growth.

| F1: 1-200 | F2: 300-600 | F3: 800-900 | F4: 1200-1500 |
|---|---|---|---|
| SPECIAL POOL: 1800-2000 | | | |

Let us assume that controller assigns flow-ID=1207 to h1→h2 flow and flow-ID=808 to h1→h3 flow. Note that each chosen flow-ID is from the corresponding egress forwarder's (unassigned) flow-ID pool. The flow-tables in F1 and F2 are shown in FIG. 3.

As it can be seen from the flow-tables of FIG. 3, all feasible (K−1) flow routes in a K-forwarder-network can be populated in each forwarder in advance (see FLOW TABLE 2 in F1 and FLOW TABLE 3 in F2). If the flow-ID of a flow is selected from the block/range of the flow-IDs assigned to the egress forwarder of that flow, no other additional entries are needed in the flow table to indicate how to forward that specific flow-ID, if only shortest path forwarding is sufficient. This elegant feature allows an inherent route aggregation of flow-ID concept. In our example case, FLOW TABLE 2 in F1 and FLOW TABLE 3 in F2 are static and pre-populated even before any live flows exist in the network. Only the other FLOW TABLES are sent by the controller to F1, F2 and F3 when 1207 and 808 are assigned to the flows.

According to an aspect of this invention, only the ingress and egress forwarders need a mapping between the actual IP header to the flow header.

Since each forwarder has a range of flow-IDs assigned to them, the controller uses one of the unassigned flow-IDs from that particular range. When the packet flow is completed (i.e., no activity using that flow-ID for a certain time-period), the assigned flow-ID for that flow returns to the pool as an unassigned flow-ID.

In other embodiments, the controller may assign flow-IDs from a specific 'sub-block' of the block of flow-IDs reserved for different levels of quality of service or service level agreement.

The control interface between the controller and forwarder (OpenFlow) needs some extensions to support flow headers. A 'header swap action' from an IP header to a flow header and vice versa will be needed. Besides, a bitmask operation may also be necessarily in a dual mode operation, if virtual port concept is not applicable or useable. The flow header can be easily identified according to the result of a bitmask operation.

Figure 4:
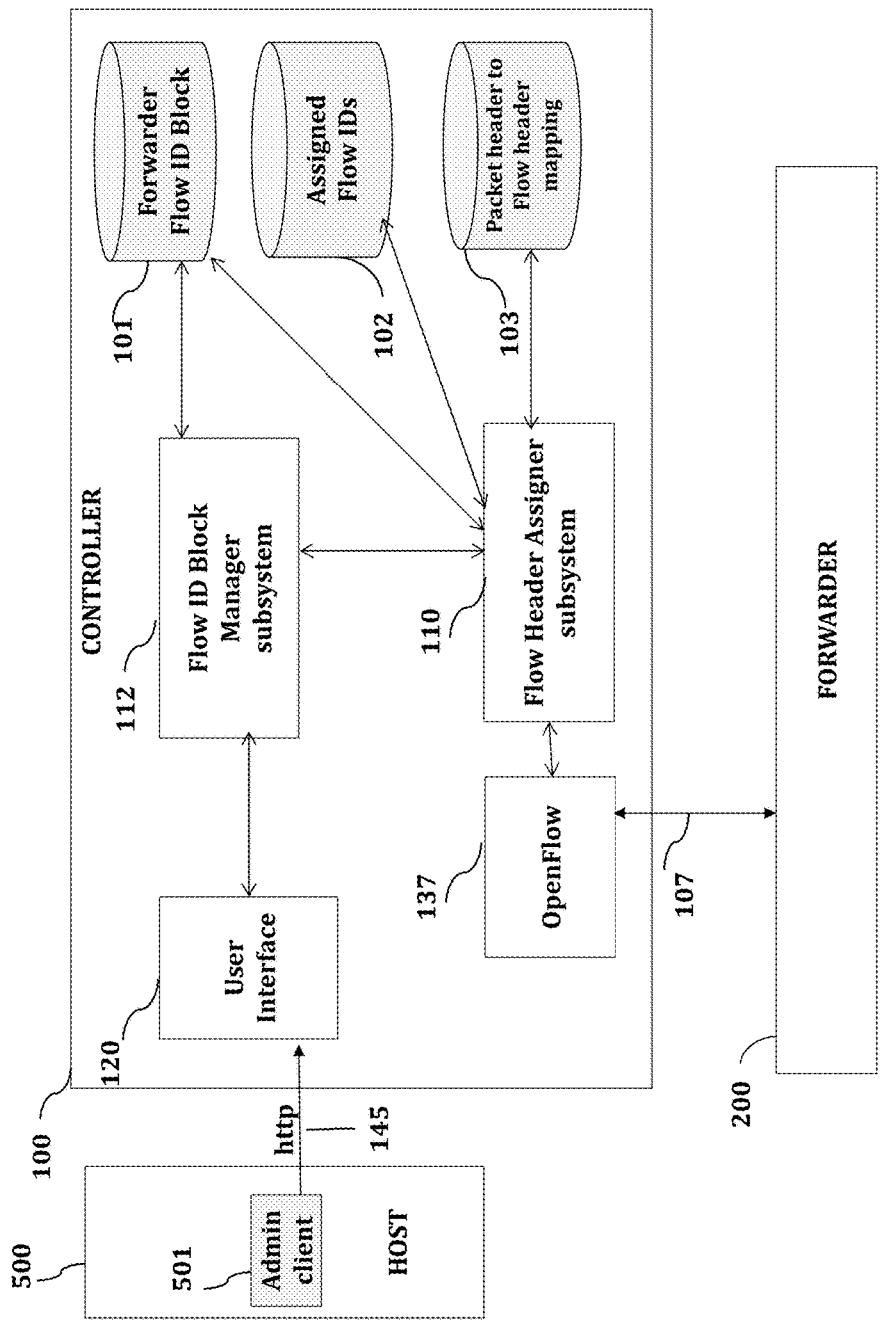
FIG. 4 illustrates the diagram of the flow ID server (FIS) integrated into the controller

FIG. 4 shows the block diagram of a controller implementation according to an embodiment of this invention.

Controller 100 attaches to forwarder 200 and host 500, on which a client application 501 runs to allow the user to request the transmission of a particular flow using a flow header. Application 501 can be an application for the system administrator to administer the features of the flow header. Controller 100 provides a user interface 120 towards application 501.

Controller 100 has several additional functions over and above the features described in prior art to support the flow header concept:

Database 101 of Forwarder Flow-ID block—This database contains the flow-ID blocks designated to each forwarder of the network and reserved for special services. It also keeps a metric of how much of the designated flow ID block is in utilization over time. This metric is used to re-calibrate the flow ID block sizes assigned to forwarders.

Database 102 of unassigned and assigned Flow-IDs—This database contains the flow-IDs that are actively in use (assigned) by a live flow. Each flow-ID is selected from the flow-ID block of the egress forwarder listed in Database 101.

Database 103 of actual packet header to flow header mapping—This database contains the mapping between each packet header to flow header for each live flow. If there is scrambling implemented during flow header assignment, the corresponding scrambling algorithm is stored here too.

Flow Header Assigner subsystem 110—This subsystem is responsible for assignment of a flow header and more specifically a flow-ID to a live flow. In one embodiment, when the first packet of a flow is sent to the controller, the controller performs the following:

(i) Determines the egress forwarder based on the destination IP address in the packet header;
(ii) Assigns a flow-ID, from the egress forwarder's flow-ID block, that is currently unassigned using information in Database 101 and 102;
(iii) Changes that flow-ID's status from unassigned to assigned in Database 102;
(iv) Constructs the flow header using the chosen flow-ID.
(v) Inserts the packet header to flow header mapping information into Database 103;
(vi) Determines control messages going to ingress and egress forwarders for header swap actions;
(vii) Sends control messages to both ingress and egress forwarders with header swap actions.

Flow-ID Block Manager subsystem 112—This subsystem is responsible for assigning flow-ID blocks to forwarders. It communicates with Flow Header Assigner 110 to monitor the utilization of Flow-IDs from a given block. It keeps a live metric of utilization in Database 101 associated with each assigned Flow-ID block. It can periodically refresh the block assignments to forwarders by enlarging or shrinking the previously assigned block. If, for example, the Flow-ID block is almost always 90% utilized (i.e., 90% of all flow-IDs in the block is assigned most of the time), then subsystem 112 enlarges the flow-ID block by assigning more flow-IDs to that forwarder. This can be achieved either by re-allocating the entire flow-ID space to the forwarders in the network in a way to accommodate high-utilization forwarders, or simply by giving more flow-IDs to whomever needs it from, say, a reserved pool. If new assignments are made, forwarders are reprogrammed with the new blocks and corresponding forwarding action and Database 101 is updated accordingly.

Flow Header control Interface 107 between the controller and forwarder—This interface is an extension of the prior art OpenFlow interface supporting additional control messaging between a forwarder and the controller to support the flow header. Note that interface 107 is shown between OpenFlow 137 and forwarder 200 to indicate that this interface is an extension of OpenFlow. In order to support the additional features, Flow Header Manager 110 communicates with OpenFlow 137, for example, sending flow header and flow-ID corresponding to a particular packet header. The following are exemplary operations on interface 107:

(i) Packet header to flow header mapping/a new flow table entry message (from controller to forwarder);
(ii) Flow-ID block assignment/reassignment message (from controller to forwarder);
(iii) Flow-ID block based forwarding/flow table entry (see FIG. 3) message (from controller to forwarder);
(iv) Flow-ID based forwarding/flow table entry (from controller to forwarder);
(v) Flow-ID idle message (from forwarder to controller);
(vi) Flow statistics query message (from controller to forwarder). The forwarder may be asked to provide packet statistics based on flow headers. (from controller to forwarder);
(vii) Flow statistics query response message (from forwarder to controller).

Figure 5:
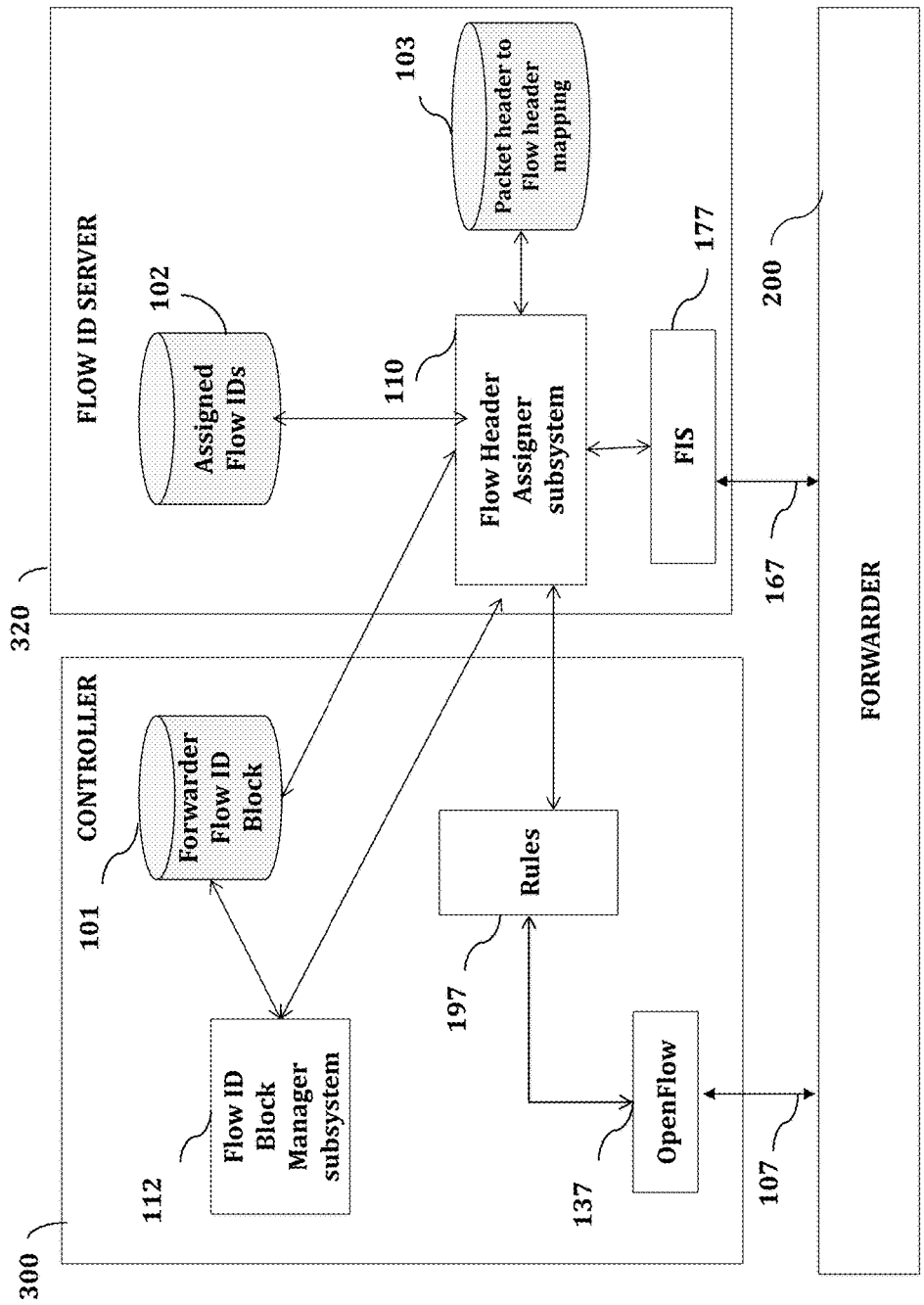
FIG. 5 illustrates the diagram of a flow ID server (FIS) separate from the controller

The block diagram of another possible embodiment is illustrated in FIG. 5. The key distinction is that Flow ID assignment process is performed by a separate server called Flow ID Server (FIS) 320. Several of the functions that are described in FIG. 4, such as Flow Header Assigner Subsystem 110 and Databases 102 and 103, are now moved into FIS 320. Additionally, a new control interface 167 is designed that is solely used for flow ID assignment, and conveniently separated from OpenFlow interface 107 of controller 300. Note that global functions such as Flow-ID block manager 112 and corresponding database 101 are kept within controller 300. Note also that a new sub-function called Rules 197 (possibly a policy engine) is incorporated into controller 300 to govern the rules of flow ID assignment. These rules can be programmed into the controller manually and automatically. This block was part of 110 in the previous embodiment. Interface 167 is a special control interface allocated for flow ID assignment and separate from OpenFlow interface 107.

Figure 6:
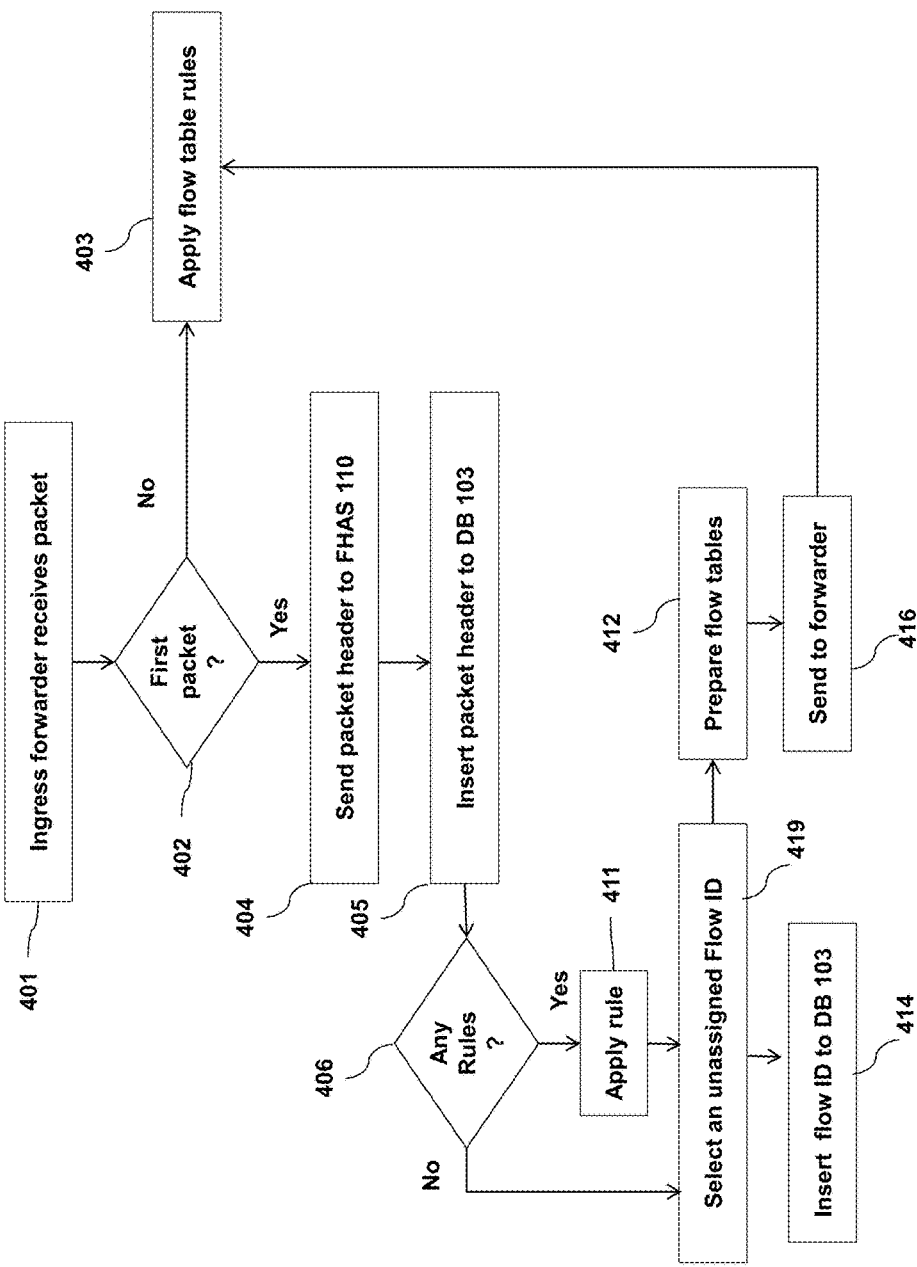
FIG. 6 illustrates a simple flow chart of the flow header assignment process using the system of FIG. 5.

FIG. 6 shows a simple flow-chart of packet processing at the ingress forwarder. The process starts at step 401 when the forwarder receives a packet. In step 402, it checks to determine if this is the first packet of the flow or not. If it is not the first packet, in step 403, it applies the flow table rules, which include a header swap then forward action. If it is the first packet, in step 404 it sends the packet's header to flow header assigner subsystem (FHAS) 110 (either on OpenFlow interface 107 according to FIG. 4 or FIS interface 167 according to FIG. 5). FHAS inserts the packet header into DB 103 in step 405. It then checks to determine if there is any special rule that applies to this packet flow or not in step 406. If there are special rules (such as higher QoS or improved security), it selects an unassigned flow ID accordingly in 419. It also inserts this flow ID to DB 103 corresponding to packet header. FHAS 110 hands off the flow ID to OpenFlow to determine flow tables applicable to the flow in step 412. The controller sends the necessary flow table entries to the forwarders along the path in step 416. Subsequently, all packets use the flow tables according to step 403.

In one embodiment, the present invention provides a method as implemented in a controller in a software defined network (SDN) facilitating communications between a first host and a second host, the controller controlling at least a first forwarder and a second forwarder in the SDN, the first host, attached to the first forwarder, originating a packet flow with the second host, attached to the second forwarder, as its destination, the method comprising: (a) determining a flow header for packets in the packet flow; (b) sending a first control message to the first forwarder to swap an original packet header of packets in the packet flow with the flow header determined in (a) prior to forwarding packets towards the second forwarder; (c) sending a second control message to the second forwarder to swap the flow header with the original packet header prior to sending packets towards the second host; and wherein the first forwarder swaps the original packet header with the flow header and forwards packets in the packet flow towards the second forwarder by looking up a first flow table corresponding to the flow header, and the second forwarder swaps the flow header back to the original packet header and forwards packets in the packet flow towards the second host by looking at a second flow table for an entry with the original packet header.

In another embodiment, the present invention provides a method as implemented in a controller in a software defined network (SDN) facilitating communications between a first host and a second host, the controller controlling at least a first forwarder, a second, transit, forwarder and a third forwarder in the SDN, the first host, attached to the first forwarder, originating a packet flow with the second host, attached to the third forwarder, as its destination, the method comprising: (a) determining, for packets in the packet flow, a flow header in which there is a free flow ID assigned from a flow ID block allocated by the controller to the third forwarder and unused by any other packet flow at time of assignment; (b) sending a first control message to the first forwarder to swap an original packet header of packets in the packet flow with the flow header determined in (a) prior to forwarding packets towards the second forwarder; (c) sending a second control message to the third forwarder to swap the flow header with the original packet header prior to sending packets towards the second host; and wherein the first forwarder swaps the original packet header with the flow header and forwards packets in the packet flow towards the second, transit, forwarder by looking up a first flow table corresponding to the flow ID block of the third forwarder in which the free flow ID falls, and the second, transit, forwarder forwards packets in the packet flow towards the third forwarder by looking up a second flow table corresponding to the flow ID block of the third forwarder, and the third forwarder swaps the flow header back to the original packet header and forwards packets in the packet flow towards the second host by looking at a third flow table for an entry with the original packet header.

In yet another embodiment, the present invention provides a controller in a software defined network (SDN), the controller sending flow table entries to a plurality of forwarders that include a swapping action from an original packet header to a flow header determined by the controller, the controller comprising: (a) a first database of forwarder flow ID blocks storing available flow IDs, each flow ID partitioned to each forwarder per a set of stored rules; (b) a second database of assigned flow IDs pertaining to active flows and unassigned flow IDs pertaining to yet-to-be-active flows; (c) a third database of packet-header-to-flow-header mapping between an original packet header to a corresponding flow header for each live flow; (d) an interface to send flow table entries with an action of header swap from an original packet header to a flow header, and vice-versa, to forwarders; (e) a flow header assigner sub-system that assigns flow-IDs to packet flows per the set of rules; and (f) a flow ID block manager sub-system assigning flow-ID blocks to forwarders.

In another embodiment, the present invention provides a method as implemented in a controller in a software defined network (SDN) facilitating communications between a first host and a second host, the controller controlling at least a first forwarder and a second forwarder in the SDN, the first host, attached to the first forwarder, originating a packet flow with the second host, attached to the second forwarder, as its destination, wherein the controller determines a flow ID for all packets belonging to a specific packet flow, the method comprising: (a) establishing a control channel between the first host and the controller and establishing another control channel between the second host and the controller; (b) receiving, from the first host, a flow ID reservation for the specific packet flow destined to the second host using the control channel; (c) replying to the first host on the control channel with a flow ID and programming forwarders on a communication path in the packet flow; and (d) sending a message using the another control channel to the second host about the flow ID the first host will use for the specific packet flow, where the first host wraps packets of the specific data flow with a flow header using the flow ID and sends them to the first forwarder to which it is attached, and where forwarders on the communication path forwards packets in the specific packet flow according to forwarding rules provided by the controller and the second host, upon receiving the packets in the specific packet flow, removes the flow header and delivers data to corresponding application.

In another embodiment, the present invention provides an article of manufacture comprising non-transitory computer storage medium storing computer readable program code which, when executed by a processor in a single node, implements a method as implemented in a controller in a software defined network (SDN) facilitating communications between a first host and a second host, the controller controlling at least a first forwarder and a second forwarder in the SDN, the first host, attached to the first forwarder, originating a packet flow with the second host, attached to the second forwarder, as its destination, the computer storage medium comprising: (a) computer readable program code executed by the controller to determine a flow header for packets in the packet flow; (b) computer readable program code executed by the controller to send a first control message to the first forwarder to swap an original packet header of packets in the packet flow with the flow header determined in (a) prior to forwarding packets towards the second forwarder; (c) computer readable program code executed by the controller to send a second control message to the second forwarder to swap the flow header with the original packet header prior to sending packets towards the second host; and wherein the first forwarder swaps the original packet header with the flow header and forwards packets in the packet flow towards the second forwarder by looking up a first flow table corresponding to the flow header, and the second forwarder swaps the flow header back to the original packet header and forwards packets in the packet flow towards the second host by looking at a second flow table for an entry with the original packet header.

In another embodiment, the present invention provides an article of manufacture comprising non-transitory computer storage medium storing computer readable program code which, when executed by a processor in a single node, implements a method as implemented in a controller in a software defined network (SDN) facilitating communications between a first host and a second host, the controller controlling at least a first forwarder, a second, transit, forwarder and a third forwarder in the SDN, the first host, attached to the first forwarder, originating a packet flow with the second host, attached to the third forwarder, as its destination, the method comprising: (a) computer readable program code executed by the controller to determine, for packets in the packet flow, a flow header in which there is a free flow ID assigned from a flow ID block allocated by the controller to the third forwarder and unused by any other packet flow at time of assignment; (b) computer readable program code executed by the controller to send a first control message to the first forwarder to swap an original packet header of packets in the packet flow with the flow header determined in (a) prior to forwarding packets towards the second forwarder; (c) computer readable program code executed by the controller to send a second control message to the third forwarder to swap the flow header with the original packet header prior to sending packets towards the second host; and wherein the first forwarder swaps the original packet header with the flow header and forwards packets in the packet flow towards the second, transit, forwarder by looking up a first flow table corresponding to the flow ID block of the third forwarder in which the free flow ID falls, and the second, transit, forwarder forwards packets in the packet flow towards the third forwarder by looking up a second flow table corresponding to the flow ID block of the third forwarder, and the third forwarder swaps the flow header back to the original packet header and forwards packets in the packet flow towards the second host by looking at a third flow table for an entry with the original packet header.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of a system and method for routing in software defined networks using a flow header. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A method as implemented in a controller in a software defined network (SDN) facilitating communications between a first host and a second host, the controller controlling a first forwarder, a second, transit, forwarder and a third forwarder in the SDN, the first host, attached to the first forwarder, originating a packet flow with the second host, attached to the third forwarder, as its destination, the method comprising:
   (a) assigning a block of flow IDs to each of the first forwarder and the third forwarder;
   (b) determining, for packets in the packet flow, a flow header in which there is a free flow ID picked from the third forwarder's flow ID block, that is unassigned to any other active data flow destined towards the third forwarder and unused by any other packet flow at time of assignment;
   (c) sending a first control message to the first forwarder to swap an original packet header of packets in the packet flow with the flow header determined in (a) prior to forwarding packets towards the second forwarder;
   (d) sending a second control message to the third forwarder to swap the flow header with the original packet header prior to sending packets towards the second host; and
   wherein the first forwarder swaps the original packet header with the flow header and forwards packets in the packet flow towards the second, transit, forwarder by looking up a first flow table corresponding to the flow ID block of the third forwarder in which the free flow ID falls, and the second, transit, forwarder forwards packets in the packet flow towards the third forwarder by looking up a second flow table corresponding to the flow ID block of the third forwarder which is pre-programmed, and the third forwarder swaps the flow header back to the original packet header and forwards packets in the packet flow towards the second host by looking at a third flow table for an entry with the original packet header.

2. The method of claim 1, wherein the original packet header is any of the following: a layer-3 header of OSI stack, layer-2 and layer-3 headers of OSI stack, or layer-2, layer-3 and layer-4 headers of OSI stack.

3. The method of claim 1, wherein there is a flow ID block which is a unique range of flow IDs pre-assigned to the first, second and third forwarders by the controller.

4. The method of claim 1, wherein the flow ID block assignment to each forwarder is any of the following: static or changes over time.

5. The method of claim 1, wherein the free flow ID assigned to the packets in the packet flow is released and returned to a free flow ID pool, wherein the free flow ID pool is a list of free flow IDs from flow ID block not yet assigned to any other flows.

6. The method of claim 1, wherein the first flow table indicates which interface of the first forwarder to forward packets in the packet flow after swapping the original packet header with the flow header containing a flow ID in in the range of the flow ID block of the third forwarder.

7. A method as implemented in a controller in a software defined network (SDN) facilitating communications between a first host and a second host, the controller controlling a first forwarder and a second forwarder in the SDN, the first host, attached to the first forwarder, originating a packet flow with the second host, attached to the second forwarder, as its destination, wherein the controller determines a flow ID for all packets belonging to a specific packet flow, the method comprising:

a. establishing a control channel between the first host and the controller and establishing another control channel between the second host and the controller;

b. receiving, from the first host, a flow ID reservation for the specific packet flow destined to the second host using the control channel;

c. replying to the first host on the control channel with a flow ID and programming forwarders on a communication path in the packet flow; and d. sending a message using the another control channel to the second host about the flow ID the first host will use for the specific packet flow, where the first host wraps packets of the specific data flow with a flow header using the flow ID and sends them to the first forwarder to which it is attached, and where forwarders on the communication path forwards packets in the specific packet flow according to forwarding rules provided by the controller and the second host, upon receiving the packets in the specific packet flow, removes the flow header and delivers data to corresponding application.

8. The method of claim 7, wherein the method further comprises sending a message, using the another control channel, to the second host about the flow ID the first host will use, and sending another flow ID to be used during a reverse path communications with the first host corresponding to the flow ID.

9. The method of claim 7, wherein the method further comprises sending a message, using the another control channel, to the second host about the flow ID the first host will use, and sending a flow-ID-to-IP-address mapping of the first host.

10. An article of manufacture comprising non-transitory computer storage medium storing computer readable program code which, when executed by a processor in a single node, implements a method as implemented in a controller in a software defined network (SDN) facilitating communications between a first host and a second host, the controller controlling a first forwarder, a second, transit, forwarder and a third forwarder in the SDN, the first host, attached to the first forwarder, originating a packet flow with the second host, attached to the third forwarder, as its destination, the computer storage medium comprising:

(a) computer readable program code assigning a block of flow IDs to each of the first forwarder and the third forwarder;

(b) computer readable program code executed by the controller to determine, for packets in the packet flow, a flow header in which there is a free flow ID picked from the third forwarder's flow ID block, that is unassigned to any other active data flow destined towards the third forwarder and unused by any other packet flow at time of assignment;

(c) computer readable program code executed by the controller to send a first control message to the first forwarder to swap an original packet header of packets in the packet flow with the flow header determined in (a) prior to forwarding packets towards the second forwarder;

(d) computer readable program code executed by the controller to send a second control message to the third forwarder to swap the flow header with the original packet header prior to sending packets towards the second host; and wherein the first forwarder swaps the original packet header with the flow header and forwards packets in the packet flow towards the second, transit, forwarder by looking up a first flow table corresponding to the flow ID block of the third forwarder in which the free flow ID falls, and the second, transit, forwarder forwards packets in the packet flow towards the third forwarder by looking up a second flow table corresponding to the flow ID block of the third forwarder which is pre-programmed, and the third forwarder swaps the flow header back to the original packet header and forwards packets in the packet flow towards the second host by looking at a third flow table for an entry with the original packet header.

11. The article of manufacture of claim 10, wherein the original packet header is any of the following: a layer-3 header of OSI stack, layer-2 and layer-3 headers of OSI stack, or layer-2, layer-3 and layer-4 headers of OSI stack.

12. The article of manufacture of claim 10, wherein the flow ID block is a unique range of flow IDs assigned to the first, second and third forwarders by the controller.

13. The article of manufacture of claim 10, wherein the flow ID block assignment to each forwarder is any of the following: static or changes over time.

14. The article of manufacture of claim 10, wherein the free flow ID is picked from the third forwarder's flow ID block, that is unassigned to any other active data flow destined to third forwarder.

15. The article of manufacture of claim 10, wherein the free flow ID assigned to the packets in the packet flow is released and returned to a free flow ID pool, wherein the free flow ID pool is a list of free flow IDs from flow ID block not yet assigned to any other flows.

16. The article of manufacture of claim 10, wherein the first flow table indicates which interface of the first forwarder to forward packets in the packet flow arriving with a flow ID in the range of the flow ID block of the third forwarder.

\* \* \* \* \*